(12) United States Patent
Malheiro

(10) Patent No.: US 12,048,343 B2
(45) Date of Patent: Jul. 30, 2024

(54) CRANIAL PROTECTION APPARATUS

(71) Applicant: John Malheiro, New York, NY (US)

(72) Inventor: John Malheiro, New York, NY (US)

( * ) Notice: Subject to any disclaimer, the term of this patent is extended or adjusted under 35 U.S.C. 154(b) by 666 days.

(21) Appl. No.: 16/786,635

(22) Filed: Feb. 10, 2020

(65) Prior Publication Data
US 2020/0253312 A1    Aug. 13, 2020

Related U.S. Application Data

(60) Provisional application No. 62/805,082, filed on Feb. 13, 2019.

(51) Int. Cl.
*A42B 3/06* (2006.01)
*A42B 3/12* (2006.01)
*B32B 5/18* (2006.01)
*B32B 7/03* (2019.01)

(52) U.S. Cl.
CPC .............. *A42B 3/063* (2013.01); *A42B 3/125* (2013.01); *B32B 5/18* (2013.01); *B32B 7/03* (2019.01); *B32B 2437/04* (2013.01)

(58) Field of Classification Search
CPC .......... A42B 3/063; A42B 3/125; B32B 7/03; B32B 5/18; B32B 2437/04
See application file for complete search history.

(56) References Cited

U.S. PATENT DOCUMENTS

| 6,658,671 B1 * | 12/2003 | Von Holst | A42B 3/064 |
| | | | 2/412 |
| 2013/0298316 A1 * | 11/2013 | Jacob | A42B 3/125 |
| | | | 2/414 |

* cited by examiner

*Primary Examiner* — Alicia J Weydemeyer
*Assistant Examiner* — Laura B Figg
(74) *Attorney, Agent, or Firm* — My Patent Guys; Christopher Pilling

(57) ABSTRACT

An improved cranial protection apparatus is provided. The apparatus comprising a three-panel outer shell having an interlocking ridge system, wherein the three-panel outer shell includes a center shell and a pair of wing shells. The interlocking ridge system including a plurality of ridges configured to provide resistance on the outer shells during impact. The three-panel outer shell is configured to deform and reconstitute its shape via various mechanisms. A stopper is provided to limit the amount of deformation.

5 Claims, 17 Drawing Sheets

CRANIAL PROTECTION APPARATUS

CROSS-REFERENCE TO RELATED APPLICATIONS

The present invention claims priority to U.S. Provisional Application Ser. No. 62/805,082 entitled "Improved Helmet", filed Feb. 13, 2019 the disclosure of which is hereby incorporated in its entirety at least by reference.

BACKGROUND OF THE INVENTION

1. Field of the Invention

The present invention relates generally to a helmet and more particularly to an improved cranial protection apparatus.

2. Description of Related Art

A Cranial protection apparatus, or helmet, is configured to protect a human skull from blunt force trauma. Most commonly available helmets include a hard or padded hat and are used in a variety of different situations, from sporting events, recreational activities, firefighting, law enforcement, military, etc. The known primary purpose of these helmets is to protect a wearer's head from injury in the event that a force is directed thereat. Thus, a principal objective of helmets for use in any situation, recreation, sporting, etc. is user safety. However there are many improvements that may be provided to protect the human skull, which are disclosed herein.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a particular object of the present invention to provide a cranial protection apparatus having an outer shell constructed from a number of layers, parts, and/or components working together to absorb and disburse a blunt force impact to the outer shell. It is another object of the present invention to provide an outer shell that is able to reconstitute quickly after an initial impact. It is another object of the invention to provide a rigid fluid encasing. It is yet another object of the present invention to provide the ability to adjust the rigidity of the cranial protection apparatus.

In order to do so, in one aspect of the invention, an improved cranial protection apparatus is provided comprising a three-panel outer shell having an interlocking ridge system, wherein the three-panel outer shell includes a center shell and a pair of wing shells; the interlocking ridge system including a plurality of ridges configured to provide resistance on the outer shells during impact; wherein the three-panel outer shell is configured to deform and reconstitute its shape via a ripcord mechanism.

In one embodiment, wherein the interlocking ridge system includes a plurality of upper ridges and a plurality of lower ridges. In one embodiment, each of the plurality of upper ridges and the plurality of lower ridges contains outer and inner facing ridges. In one embodiment, the interior facing ridges are between a −85 to −60 degree angle and the outer facing ridges are between a 35 to 60 degree angle. In another embodiment, the interlocking ridge system includes a stopper configured as the final point in which the outer shell can deform. In one embodiment, the stopper is constructed from at least one material essentially consisting of: acrylonitrile butadiene styrene, hard rubber, viscoelastic polyurethane foam, polyvinyl chloride, ethylene propylene rubber, ethylene propylene diene rubber, or similar. In another embodiment, the stopper is substantially parallel to the ridges of the interlocking ridge system. In yet another embodiment, the stopper includes two holes through which two skeletal beams pass through providing strength and stability.

In one embodiment, a screw mechanism is positioned on the center shell, wherein the screw mechanism is configured to raise or lower the plurality of upper ridges creating more or less frictional contact with the plurality of lower ridges of the interlocking ridge system. In one embodiment, the ripcord mechanism includes a cord fastened to an inner portion of the plurality of lower ridges. In another embodiment, the cord is pulled at both ends such that the plurality of lower ridges are moved back into position after a deformation of any impact, reconstituting the shape of the apparatus.

In yet another embodiment, a plastic fish scale pattern layer is provided. In another embodiment, a compound layer consisting of a gel filled tube layer inserted on top of a memory foam padding is provided. In another embodiment, a thin layer of plastic between the gel filled tube layer and the memory foam padding is provided. In another embodiment, skeletal framing is provided.

In another aspect of the invention, an improved cranial protection apparatus is provided comprising an outer shell having at least two layers configured to absorb the initial impact of any blunt forces applied to the apparatus during use; and, a spring mechanism configured to adjust the rigidity of the apparatus, wherein the spring mechanism includes a plurality of pins and a plurality of spring loaded slots.

In one embodiment, the spring mechanism gives the outer shell a deformation variation of 1" on either side. In one embodiment, each spring loaded slot of the plurality of spring loaded slots includes a backstop for each spring in the spring loaded slot. In another embodiment, a stopper configured to prevent the at least two layers of the outer shell from directly touching one another is provided.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

Figure 1:
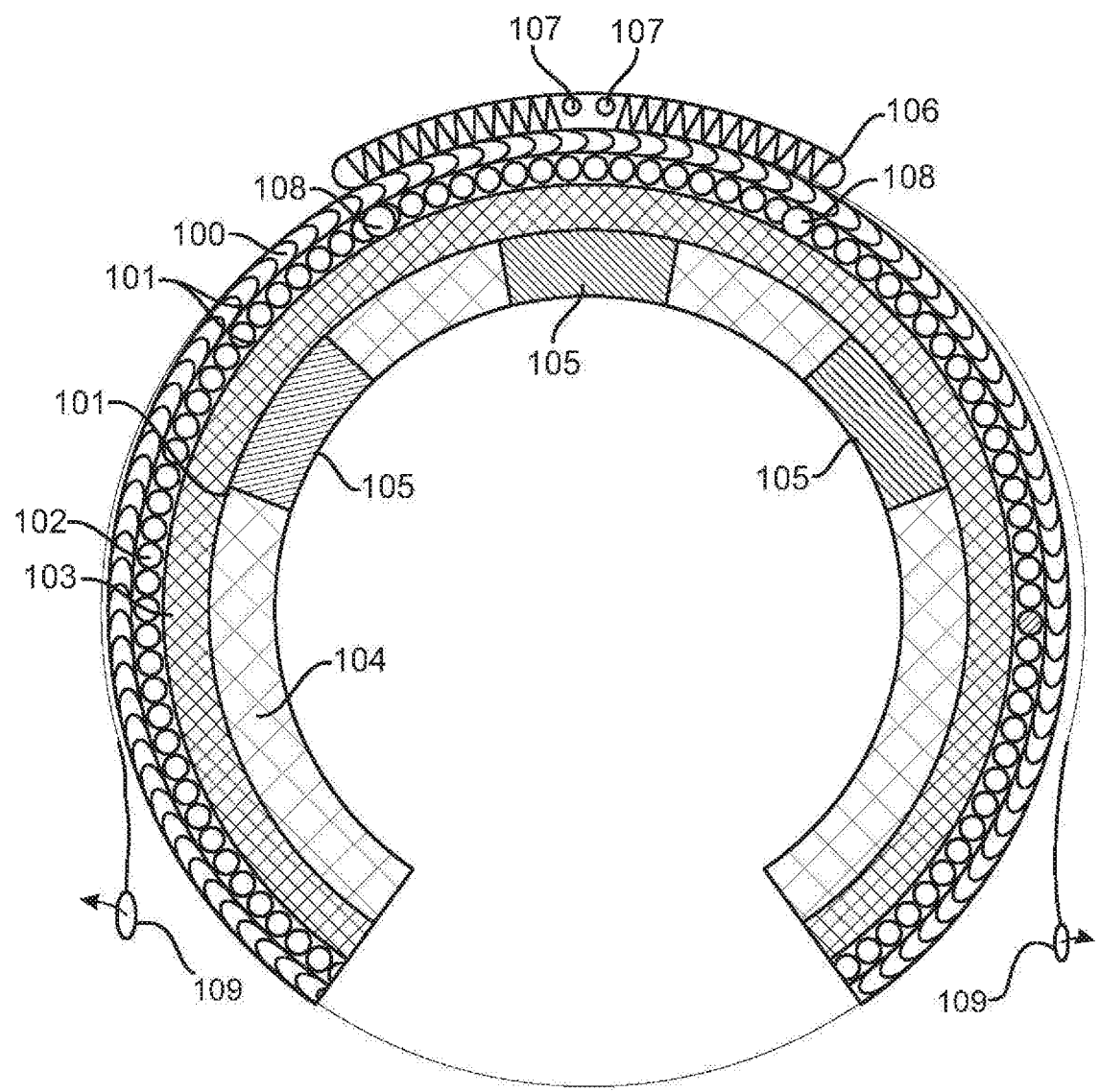
FIG. 1 is a cross-sectional view of the of improved cranial protection apparatus portraying the various layers of protection according to an embodiment of the present invention.

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide an improved cranial protection apparatus.

Referring now to any of the accompanying FIGS. 1-13, an improved cranial protection apparatus is illustrated. The improved cranial protection apparatus comprises at least two of the following: (a) a three-panel outer shell 100/106 with interlocking ridges; (b) a plastic fish scale pattern layer 101/201 embedded in lightweight canvas 202; (c) a compound layer comprising a gel filled tube layer 102 inserted on top of a memory foam padding 105. In some embodiments, between the tubes and foam there is a thin layer of plastic to keep the gel tubes in place and provide extra support; (d) a skeletal framing 110 of the helmet is fitted and runs through the foam padding of the compound layer that connects to the outer rim of the skeletal frame; (e) an accordion-shape-like plastic 103 or similar type material layer that allows for deformation at the same time as providing support (f) an air filled octopods with on-impact air release valve having strategically placed memory foam pads for support and comfort; and, (g) alternating thin layers of perforated visco-elastic polymer.

FIG. 1 is a perspective view of an embodiment of the present invention. Referring now to FIG. 1, the improved cranial protection apparatus consists of a three panel outer shell 100/106 (a center shell and two wing shells and) made from, but not limited to, acrylonitrile butadiene styrene ("ABS") a thermoplastic polymer, polyethylene ("PE"), polypropylene ("PP") or Carbon Fiber. In one embodiment, each panel will measure between 0.2 cm to 1 cm in thickness. The thickness and material will depend on usage and application of the present invention. It is contemplated that the structure of the present invention may be used for, but not limited for use as American football helmets, hockey helmets, baseball helmets, bicycle helmets, safety helmets for use by construction workers and the like. It is contemplated that the structure of the present invention may be used for other types of sports or safety helmets currently not identified. The apparatus of the present invention allows for greater protection than other helmets available due in part to the three panel outer layer ability to deform and quickly recapture its shape due to a ripcord mechanism 109 as part of the ridge system (FIG. 7) of the three panel outer layer. In some embodiments, a screw mechanism 112 is provided, wherein the screw mechanism as part of the center panel which may allow a user to determine comfort and safety. In some embodiments, the screw is located under a cap on the top part of the center panel of the outer shell. The screw is configured to raise or lower the upper ridge portion of the apparatus creating more or less contact with the lower portion of the ridge system, which is configured to adjust the friction. This is adjustable by the user as desired to increase or decrease the friction.

In one embodiment, the ridge system encased in the three outer shell panels is made from at least one material selected from a material set consisting of: acrylonitrile butadiene styrene, hard rubber, viscoelastic polyurethane foam, polyvinyl chloride, ethylene propylene rubber, ethylene propylene diene rubber, or similar. In one embodiment, the ridge system includes an upper section located on the underside of the center panel, two lower sections, each located on each of the outer panels, and a ripcord system 109. In some embodiments, each ridge section comprises a series of serrated elements, measuring between 0.5 cm and 1.25 cm in elevation. In one embodiment, the interior facing ridges will be between a −85 to −60 degree angle and the outer facing ridges will be between a 35 to 60 degree angle and will run between but not limited to, 10 cm to 25 cm in length. In additional to the ridges, in some embodiments, a stopper is provided 108 (FIG. 7), wherein the stopper is constructed from a material, wherein the material is by non-limiting example, acrylonitrile butadiene styrene, hard rubber, viscoelastic polyurethane foam, polyvinyl chloride, ethylene propylene rubber, ethylene propylene diene rubber, or similar. Advantageously, the ridges are designed to provide resistance on the outer shells during impact with the stopper serving as the final point in which the apparatus can deform. The ridges and stopper mechanism are non-existent in the prior art and is at least one novel aspect of the present invention. In one embodiment, the stopper mechanism measures between 1 cm to 4 cm wide, between 2 cm to 4 cm thick, and runs parallel to the ridges. In some embodiments, the stopper includes two holes through which two skeletal beams pass through providing greater strength and stability.

Figure 13A:
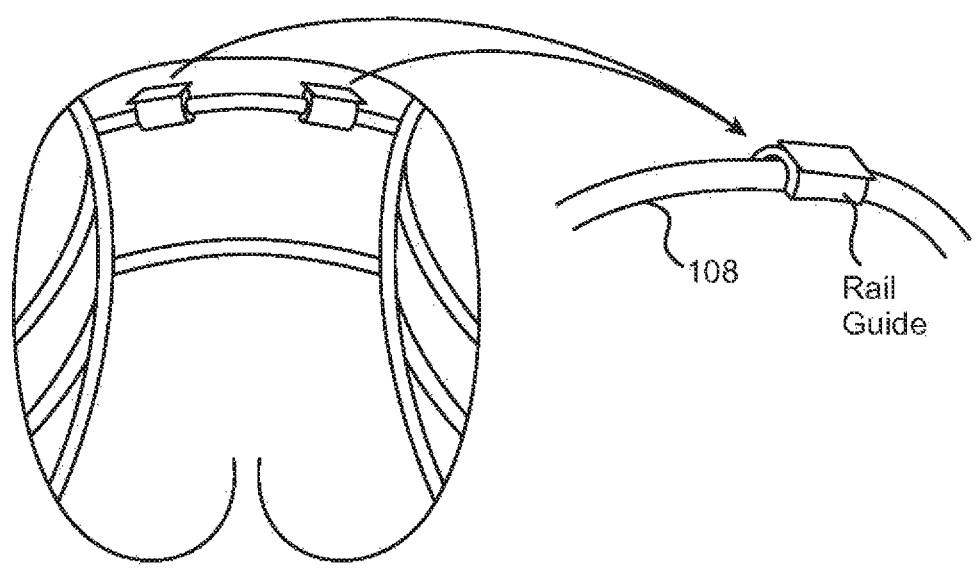
FIGS. 13A-B are various views of the embodiment depicted in FIG. 1 of the present invention portraying the rail guide system.
Figure 13B:
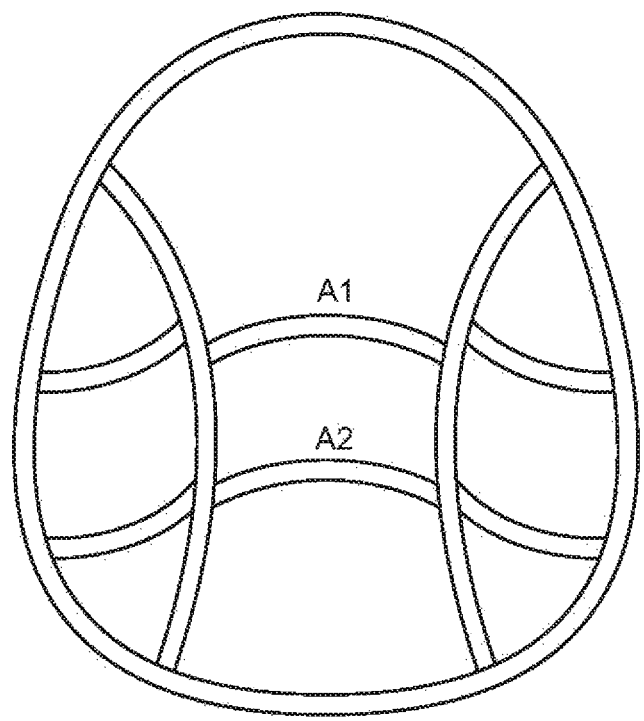
Figure 13B:
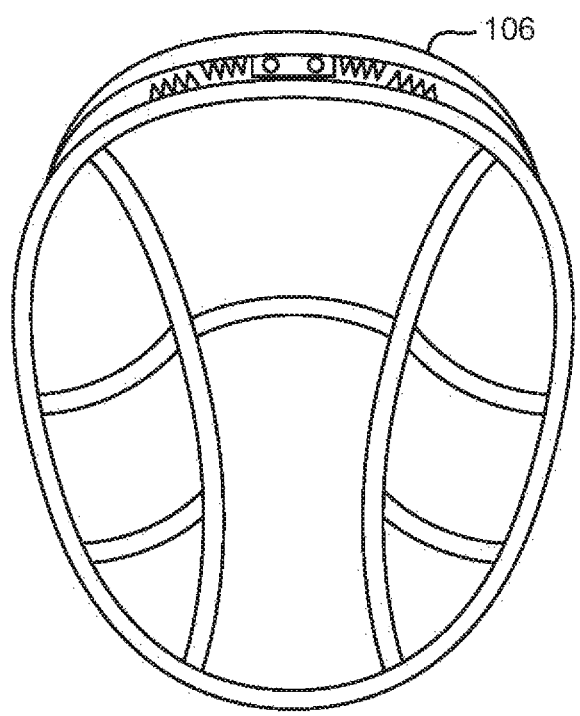

In some embodiments, two ridge guides are provided, best seen in FIG. 13A. The ridge guides are affixed to the under part of the ridge section of the lateral outer shells panels. In one embodiment, the ridge guides are constructed of PVC. The ridge guides are configured to maintain and center the direction of the lateral panels during impact. Further, the ridge guides keep the panels moving laterally while restricting any lateral or downward movement. The ridge guides glide along the inner skeletal cross tubes and are fitted securely wrapping ¾ around the tube providing stability.

Figure 7:
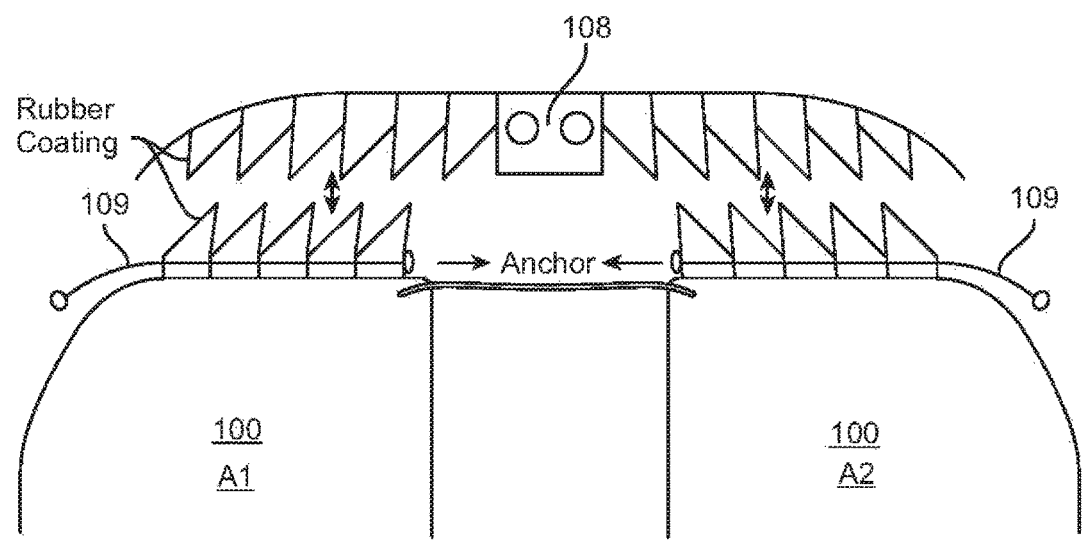
FIG. 7 is a cross-sectional view of the embodiment depicted in FIG. 1 of the present invention portraying the interlocking ridge system of the outer layer.
Figure 8A:
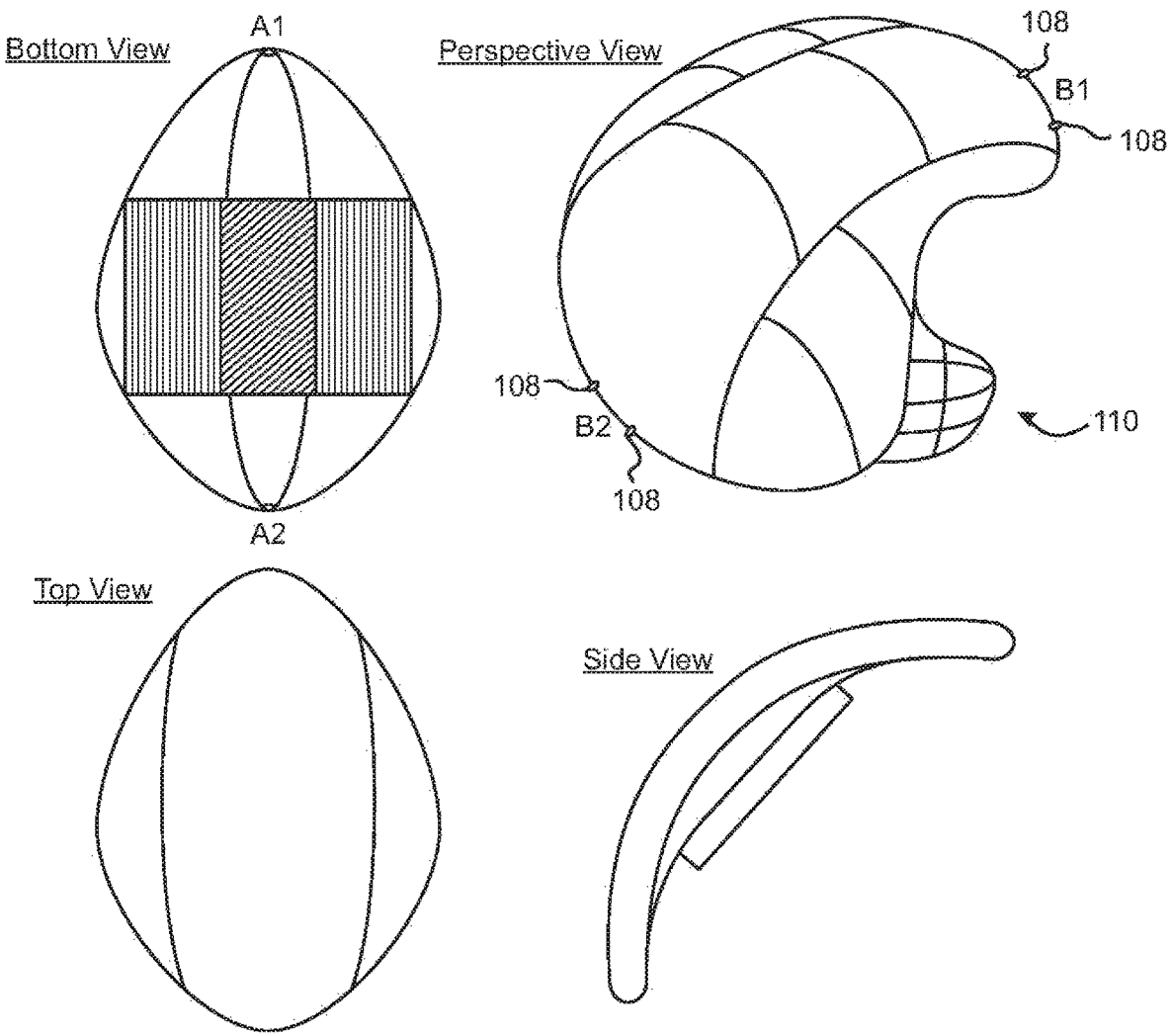
FIGS. 8A-B are sectional views of the embodiment depicted in FIG. 1 of the present invention portraying the center interlocking member of the outer layer.
Figure 8B:
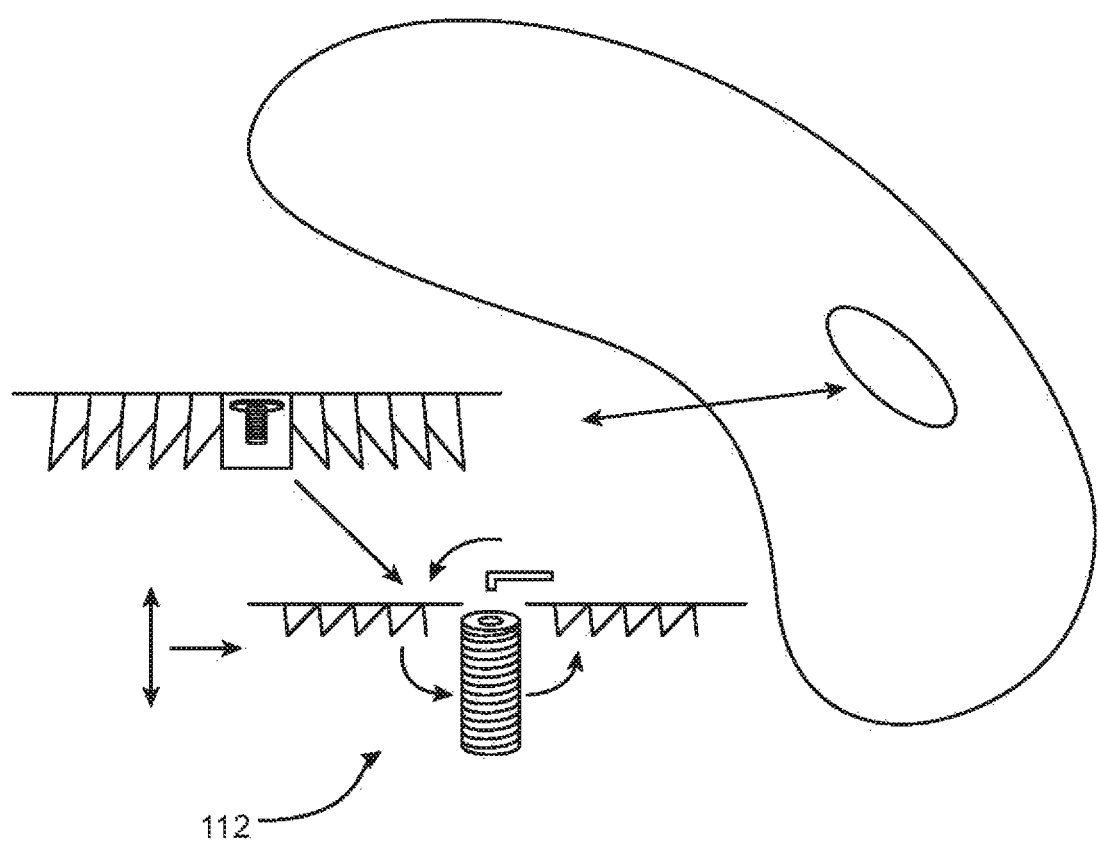

In some embodiments, the ripcord system 109 is fastened to the inner most portion of the lower parts of the ridge system, best seen in FIG. 7. In one embodiment, the ripcord system consists of a nylon cord measuring between 0.5 mm to 3 mm. The ripcord system passes through two perforations on the inner portion of ridge below the teeth of the lower ridge on the two side outer shell panels, and exits via a single perforation through the side panels of the lateral outer shells. The ends are fused by known conventional means and is enclosed and sealed in a nylon protective cover. Finally, a neodymium magnet is placed with the cord 109 and that will enclosed in a canvas protective cover. In some embodiments, a small neodymium magnet is fused to the outer portion of the outer panel of the apparatus where the cord handle can be safely stored while still easily accessible when needed. In one embodiment, the ripcord is pulled at both ends pulling the lower ridges back into position after a deformation of any impact, reconstituting the shape of the helmet.

Figure 2:
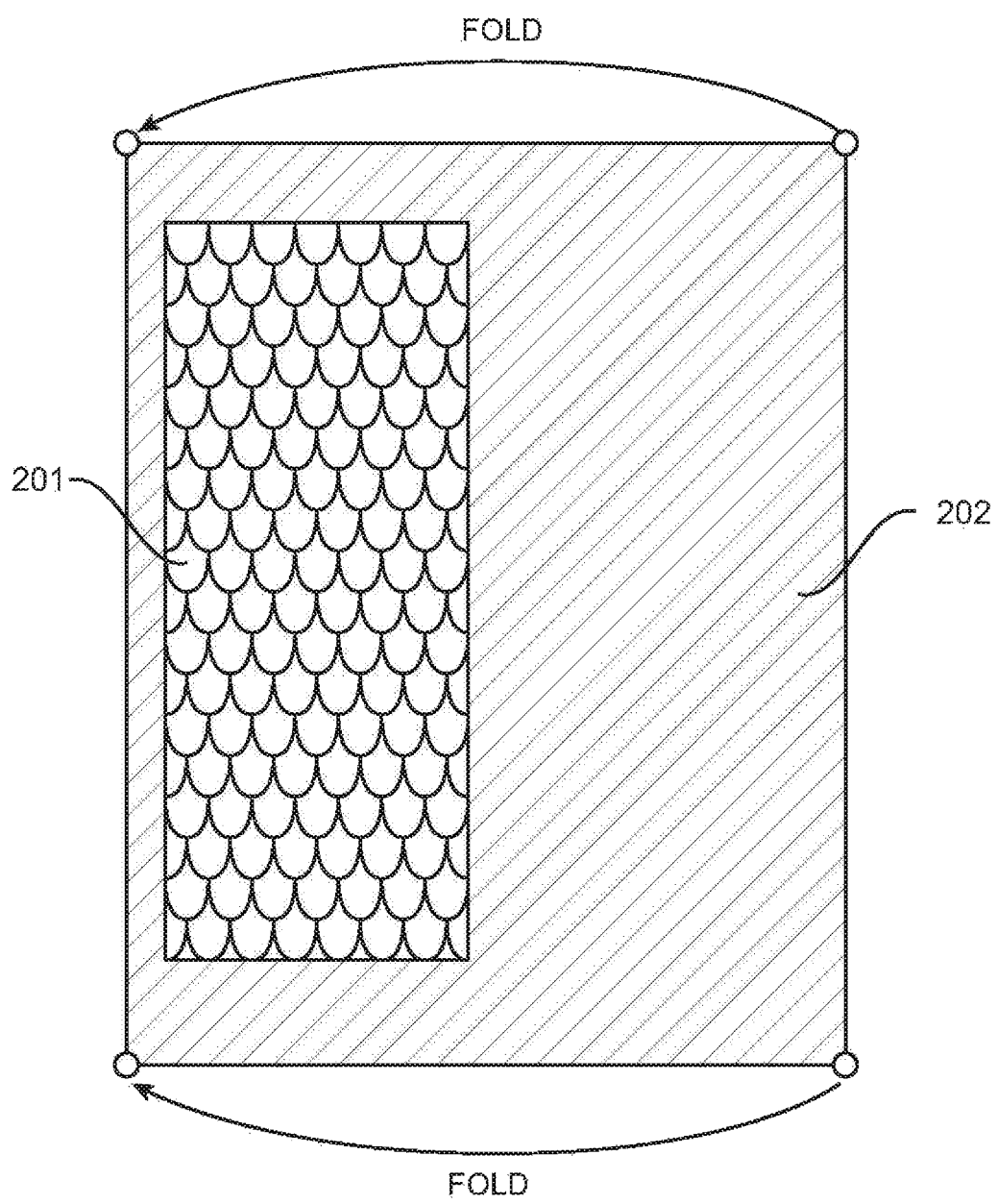
FIG. 2 is an expanded view of the embodiment depicted in FIG. 1 of the present invention portraying the plastic fish scale layer.
Figure 3:
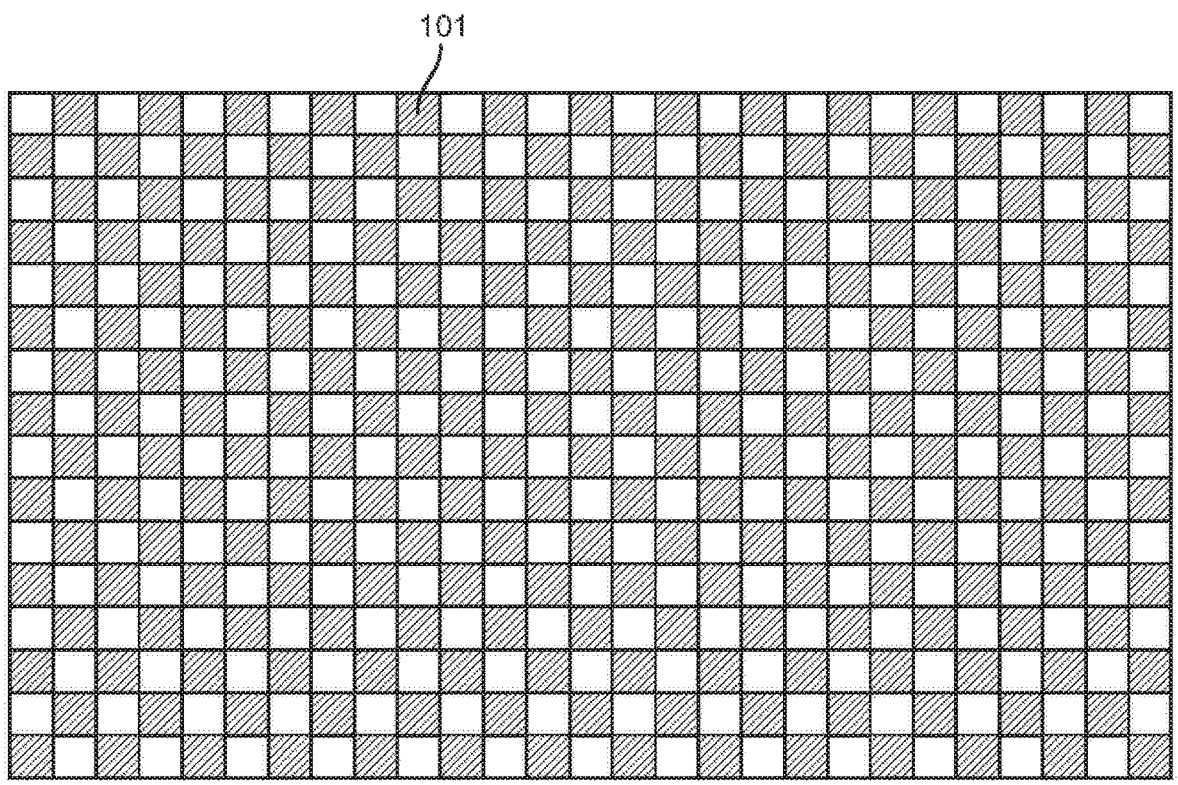
FIG. 3 is a front view of the embodiment depicted in FIG. 1 of the present invention portraying the viscous rubber perforated layer.

FIG. 2 illustrates the plastic fishscale layer 201. The fishscale layer comprises numerous fish scale shaped pieces made of, but not limited to, polyvinyl chloride ("PVC"), wherein the numerous fish scale shaped pieces measure between 0.5 cm to 1.5 cm in width and length, and between 0.05 mm and 0.1 mm in thickness. In some embodiments, the fishscale layer comprises an interlocking layer pattern, wherein the individual fish scale pieces are affixed in place, such as with glue, sewn, or other known methods to maintain the shape. In some embodiments, the fish scale pieces are enveloped by a thin layer of protective canvas, preferably made from nylon. However, other types of commonly known material are contemplated. This fish scale shape and layered form enclosed in fabric is designed to absorb and dissipate blunt trauma to the cranial protection apparatus in an efficient and sturdy manner. Advantageously, the fish scale pattern and materials are configured to mimic the strength that real fish scales provide. Further, enclosing the pattern into a protective casing allows for even greater protection.

Figure 4A:
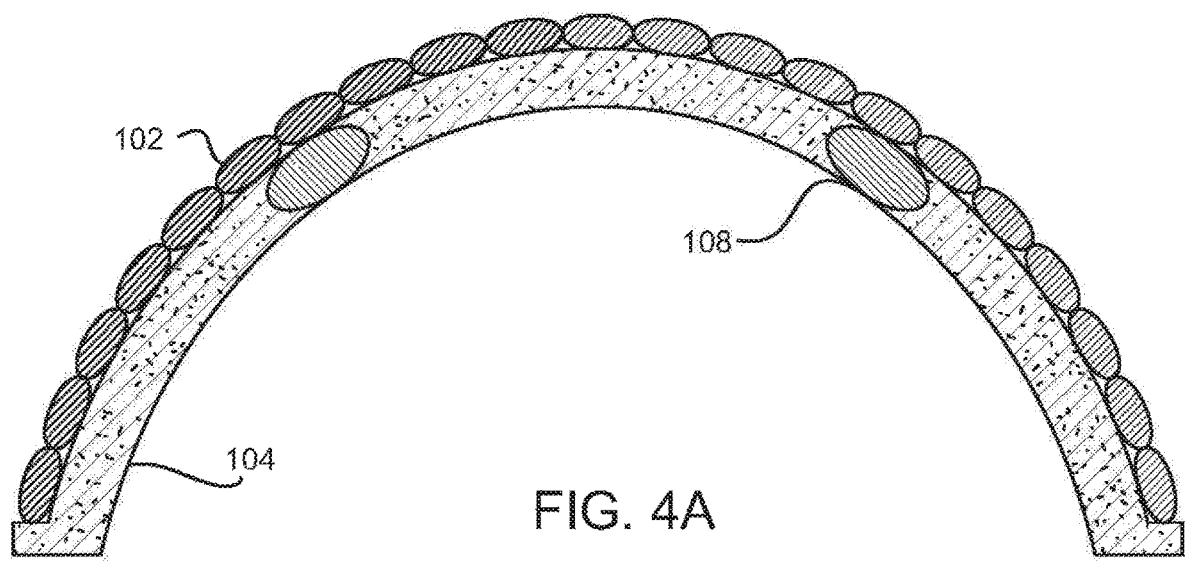
FIG. 4A is a cross-sectional view of the embodiment depicted in FIG. 1 of the present invention portraying gel tube layer positioned on memory foam layer.
Figure 4B:
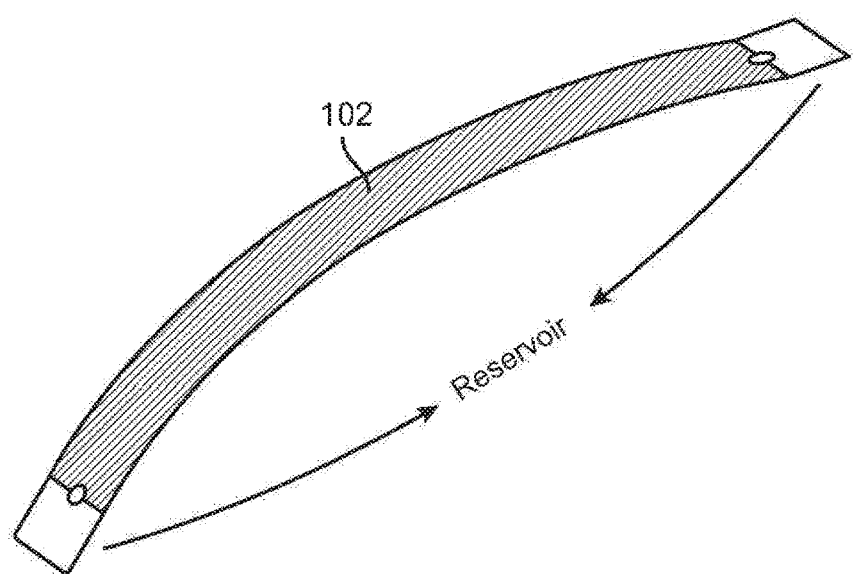
FIG. 4B is a cross-sectional view of the embodiment depicted in FIG. 1 of the present invention portraying the construction of a gel tube.
Figure 5:
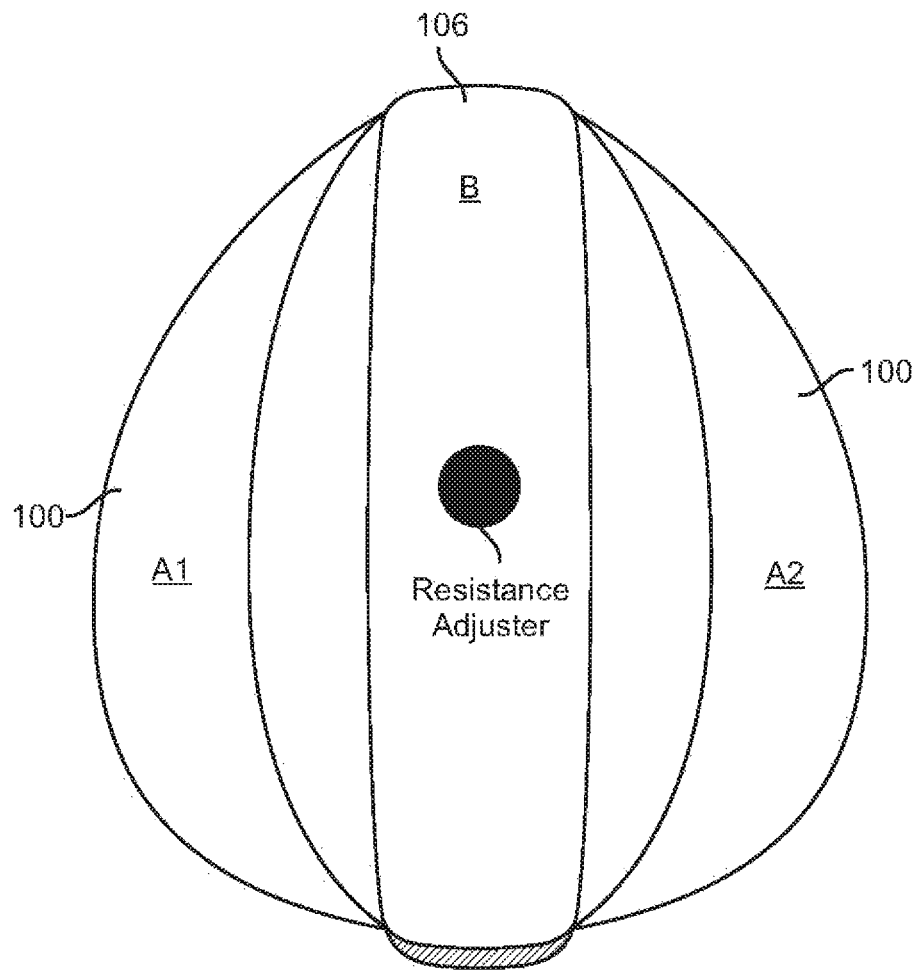
FIG. 5 is a view of the embodiment depicted in FIG. 1 of the present invention portraying the outermost layer.
Figure 6:
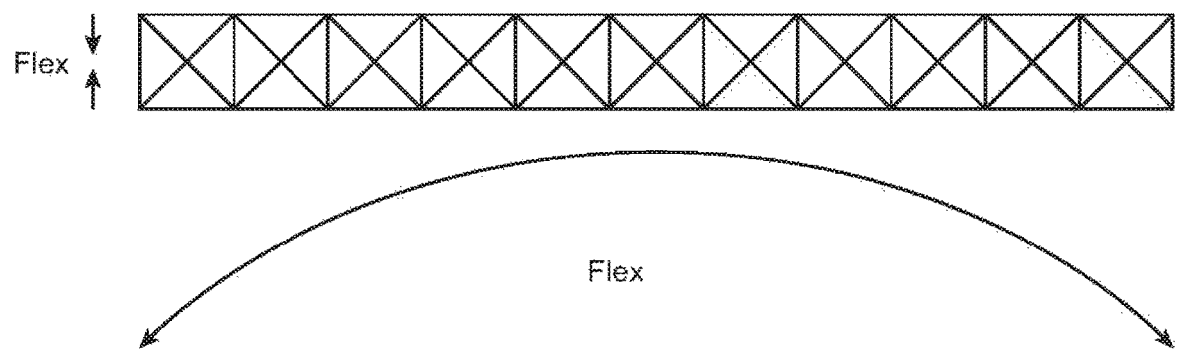
FIG. 6 is a view showing the flexibility of a protection layer according to an embodiment of the present invention.

FIG. 4A shows the ellipse-shape gel tube layer 105 of the cranial protection apparatus. In some embodiments, the gel tube layer is constructed of by non-limiting example, polyvinyl chloride, ethylene propylene rubber, ethylene propylene diene rubber, or similar. In one embodiment, the tubes measure between 0.5 cm and 2 cm in lateral diameter and are filled with, by non-limiting example, glycerine, silicone gel, or similar. In some embodiments, the tubes will run front to back and sit atop a thin layer of perforated PVC measuring between 0.5 mm and 1 mm in thickness. In some embodiments, the preferred PVC is layered atop a fitted memory foam pad 104 made from viscoelastic polyurethane foam which will measure between 1.5 cm and 3.0 cm thick. The cranial apparatus skeletal beams will run through the memory foam pad providing support, structure, and flexibility. The memory foam pad is configured to work in conjunction with the previous layers to provide greater protection during a high impact collision. In some embodiments, best seen in FIG. 4B, the gel tube layer will include a reservoir at each end with a regulator to allow for the control of fluid between the main chamber and the reservoir. During impact, the fluid will evacuate the main chamber into the reservoir, the fluid will then return back to the main chamber immediately after impact, behaving similar to a spring or a hydraulic system. The thin perforated PVC layer will provide support and restrict the lateral movement and positioning of the tubes. The memory foam pad will again provide dampening of severe impact and will retake its shape immediately following impact.

Figure 9:
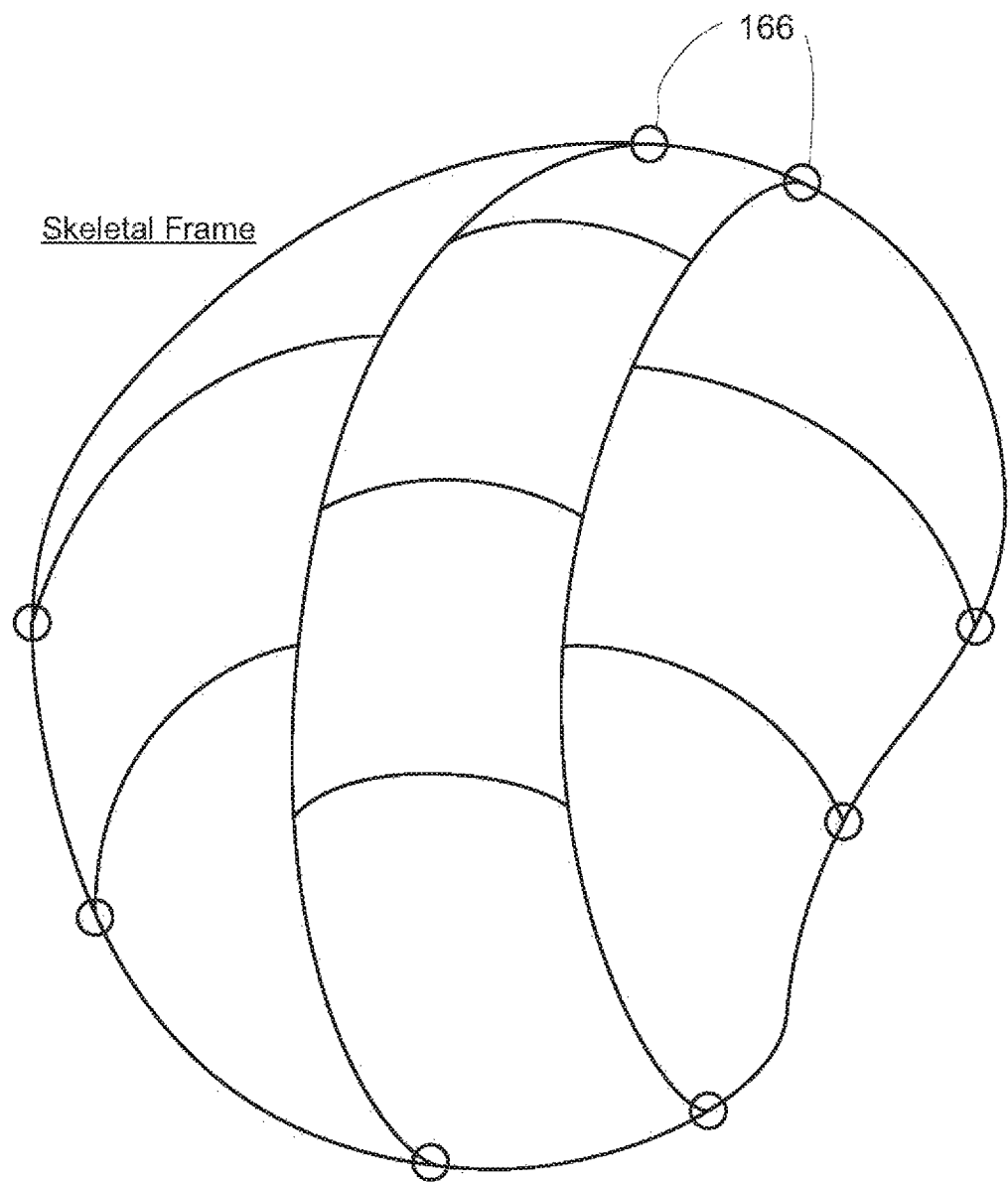
FIG. 9 is a perspective view of the embodiment depicted in FIG. 1 of the present invention portraying the skeletal frame.
Figure 10:
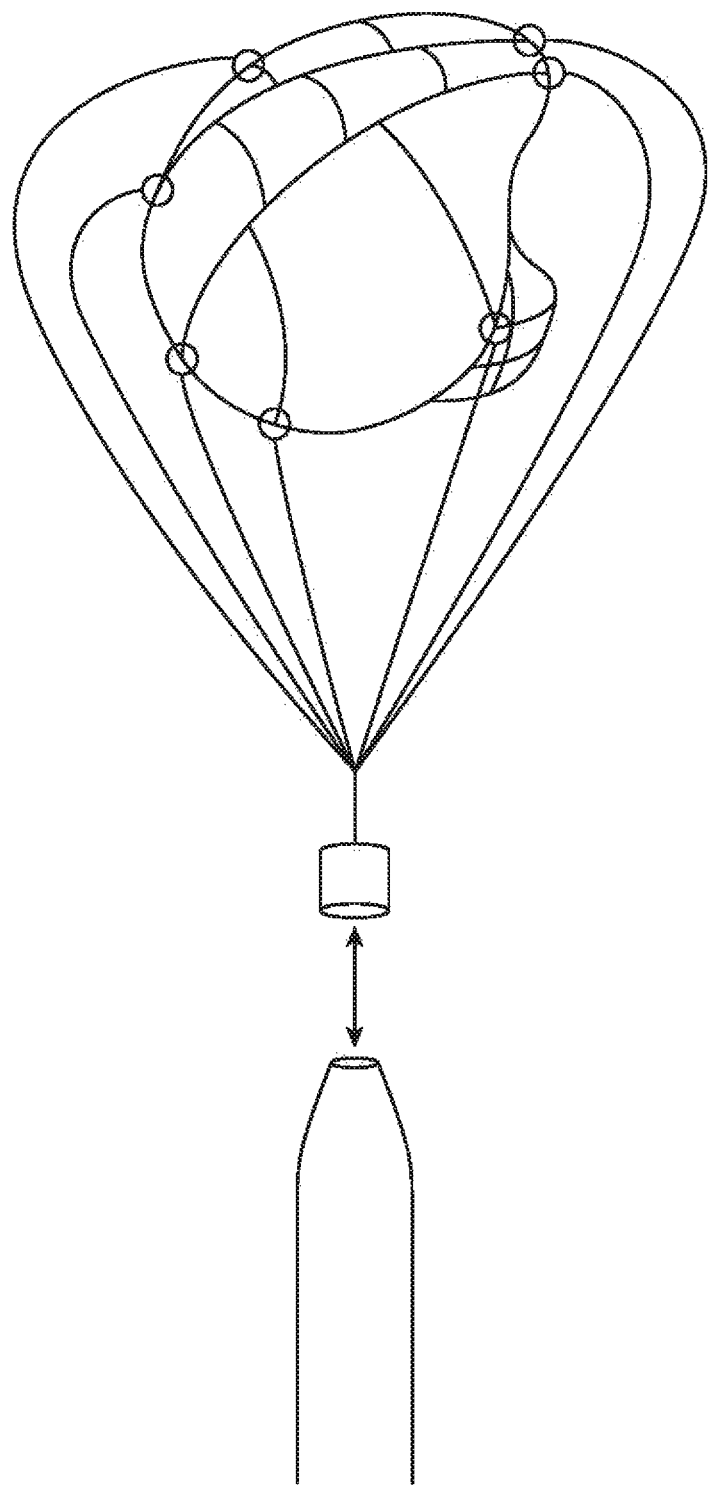
FIG. 10 is a sectional view of the embodiment depicted in FIG. 1 of the present invention portraying the interlocking junctions of the skeletal frame.
Figure 11:
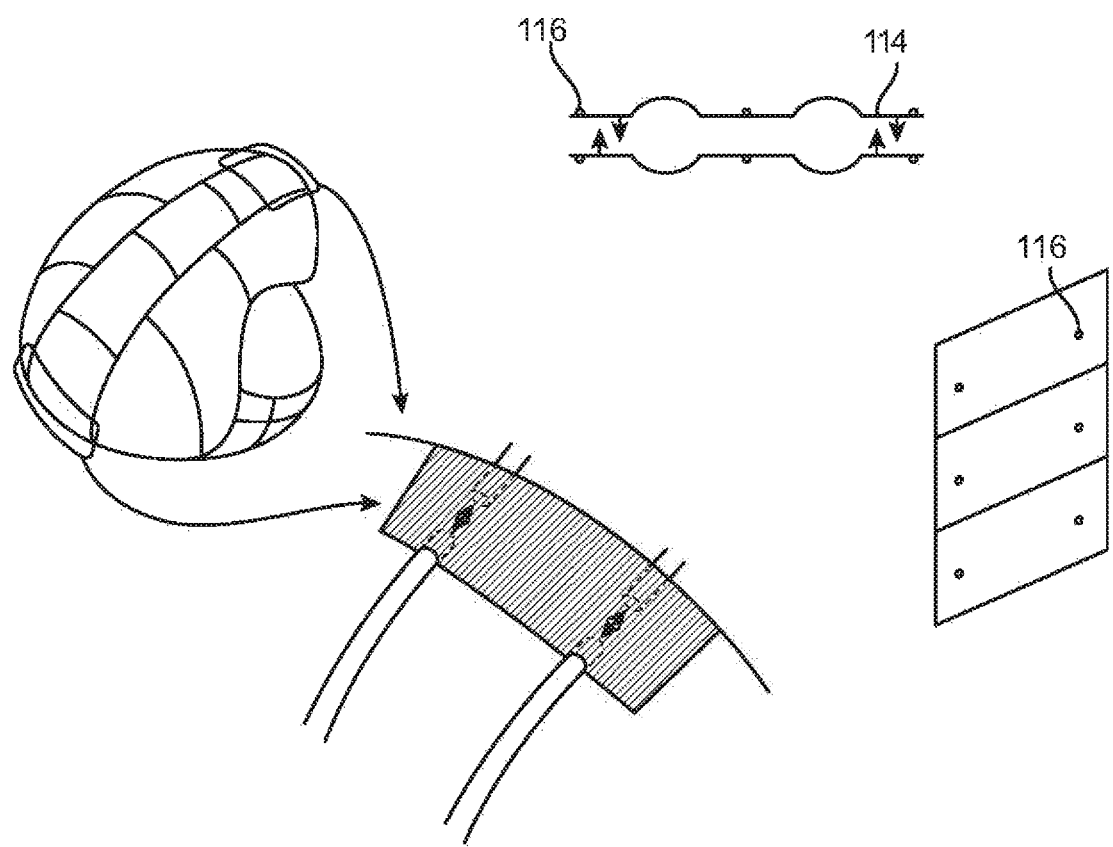
FIG. 11 are sectional views of the embodiment depicted in FIG. 1 of the present invention portraying the stability plates employed at the interlocking junctions of the skeletal frame.

FIG. 9 depicts the skeletal frame of the cranial apparatus that may be separated into two parts, and be constructed from, but not limited to, carbon fiber or acrylonitrile butadiene styrene ("ABS"). In some embodiments, the skeletal framing may be made with, but not limited to, round or ellipse shaped tubing. In one embodiment, the tubes measure between 0.5 mm to 2 cm in diameter. While the outer rim portion of the frame is solid and will not move in any way, the interior portion of the skeletal framing will have omnidirectional flexibility. This is allowed by the way in which the outer and inner portions of the skeletal frame are affixed. At the each connection point 166 of the two skeletal portions, 12 in total, there is a dampening system configured for allowing impact absorption and dissipation. This mechanism may be designed using a plate 114 to enclose the connection points 116 (See FIG. 11). In some embodiments, at each connection point on the outer portion of the skeleton there is a cavity that will encase the tips of the inner skeletal. In some embodiments, each cavity on the outer frame and each tip of the inner frame includes rubber dampers. Advantageously, the tips will tapper toward the ends allowing them to be snuggly incased into the cavities. The tips, while fitting sturdily, will have flexibility allowing for omnidirectional movement. In some embodiments, at the front (brow) connectors and at the rear (neck) connectors, there is a PVC fastener plate attached to the outer frame and envelop the two connection points to provide protection and to guarantee the inner frame will never come unhinged from the outer frame (See FIG. 11).

Figure 12:
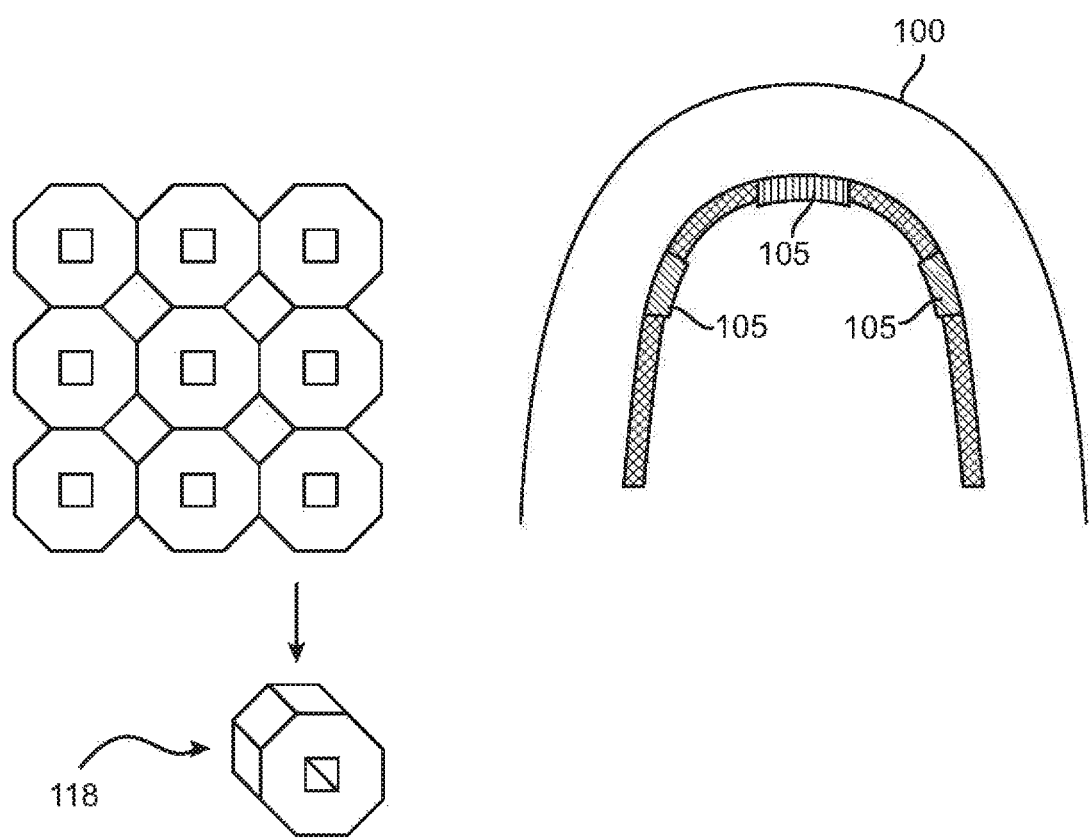
FIG. 12 is a sectional views of the embodiment depicted in FIG. 1 of the present invention portraying the memory foam (comfort) padding layer.

FIG. 12 depicts an octopod/Foam layer 118 of the helmet that may comprise a layer of three dimensional (3D) interconnected, air-filled octagon-shaped matting made from silicone and visco elastic polymer. Interlocking memory foam pads made from Viscoelastic Polyurethane foam may be strategically placed for comfort. The octopods will measure a radius of between 1 cm to 3 cm, and between 0.5 cm to 3 cm thick. The square Foam pads will measure between but not limited to, 3 cm to 6 cm in length per side and between 0.5 cm to 3 cm thick. The octopod matting may have an air release valve system that will allow for air to evacuate during impact providing a gentler impact to the skull, after impact the octopods will automatically re inflate. The memory foam will be placed as follows, three pads intermittently placed running from the crown of the helmet to the back and two on each side of the helmet. These foam pads will serve dual purpose, they will allow for optimal comfort and setting the helmet on the users head while also providing impact absorption and dissipation.

In some embodiments, perforated visco-elastic polymer layers are provided. These thin layers of polymer will measure between 0.5 mm to 2 mm in thickness and will be fitted between certain layers of the helmet. They may be between the outer shell and the fishscale layers, the fishscale and the gel tubes layer and between the memory foam and octopod layers. This thin visco-elastic polymer layers will provide stability for each of the other layers in contact with yet, restricting lateral shifting and movement by those layers while at the same time providing another layer of dampening and dissipation during impact.

In some embodiments, the present invention may allow for various types of face masks 110 depending on user preference. Face masks will be attached to the outer portion of the solid skeletal framing of the helmet. Face masks will vary in size and design to meet the user's needs. They will be constructed from but not limited to Carbon Fiber or Acrylonitrile butadiene styrene.

In some embodiments, there may also be a chin strap available for use which will be affixed through snaps on either lateral side of the outer portion of the shell.

In some embodiments, there may also be a comfort padding made from Viscoelastic Polyurethane foam located at the bottom rear of the helmet where the neck and helmet make contact. This padding will be affixed using, but not limited to, glue or other commonly known means.

Figure 14:
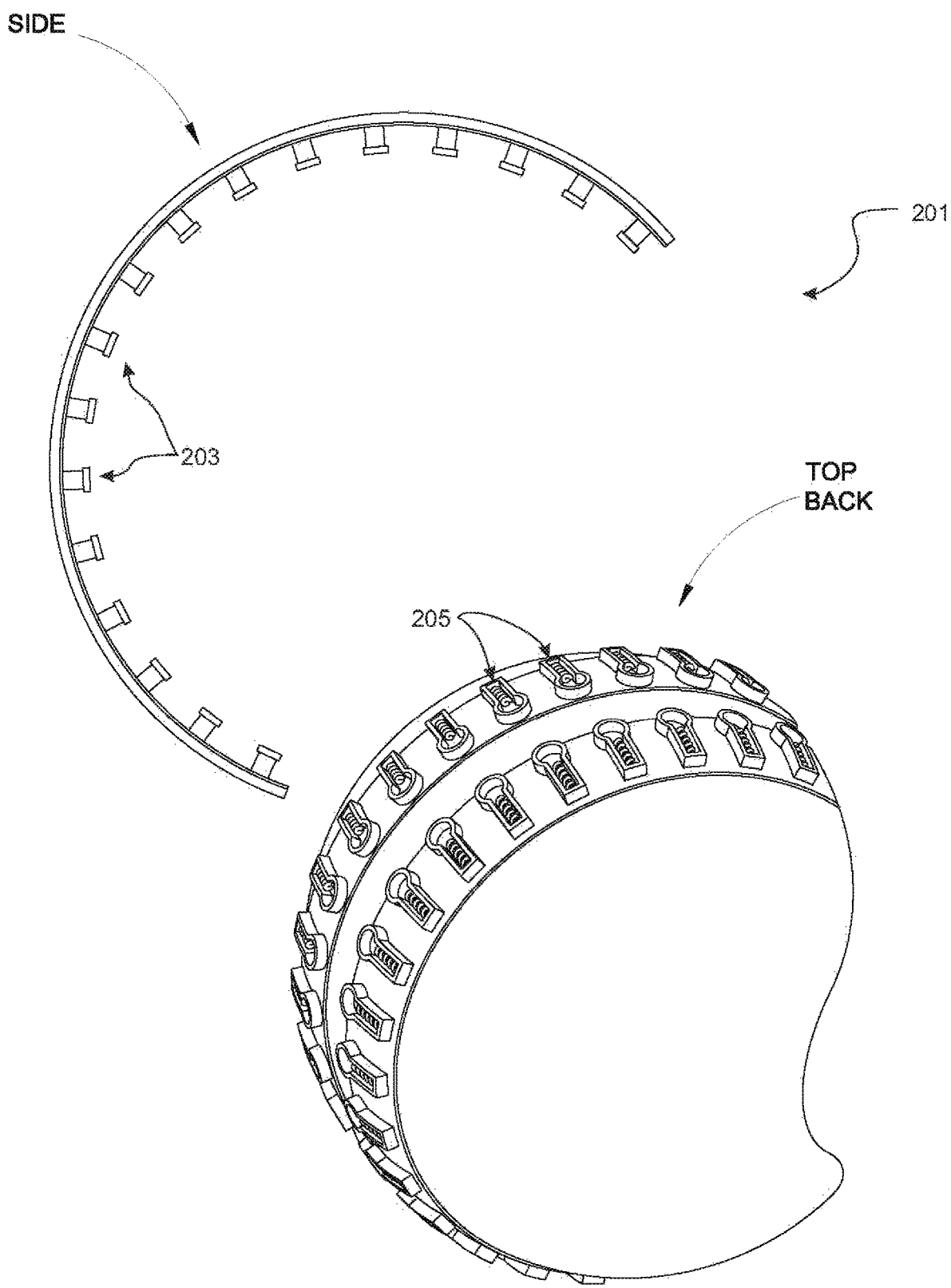
FIG. 14 is an exploded view of an alternative embodiment of an outer shell of the cranial protection apparatus according to an embodiment of the present invention.
Figure 15:
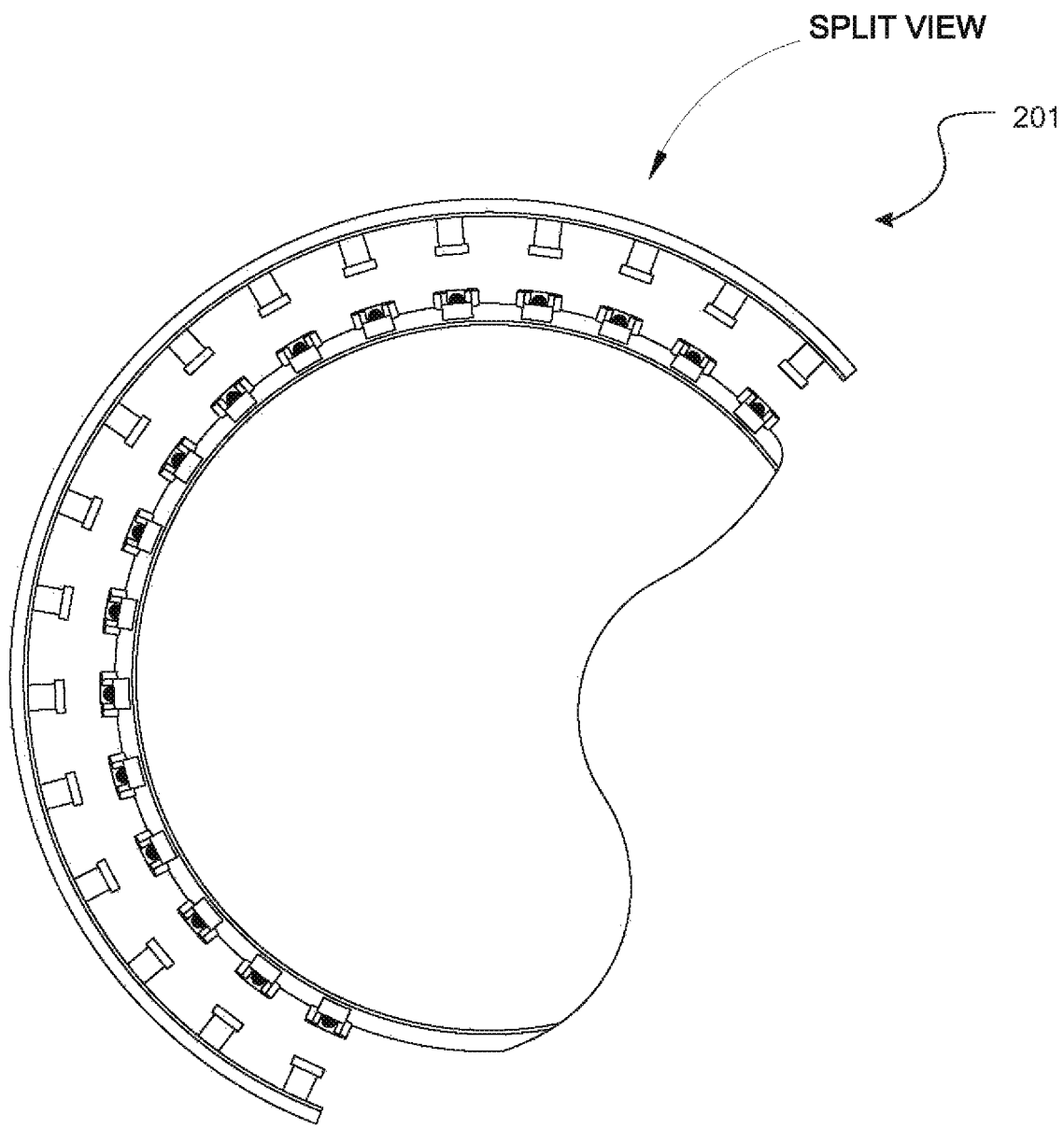
FIG. 15 is a split view of two layers of the outer shell according to an embodiment of the present invention.
Figure 16:
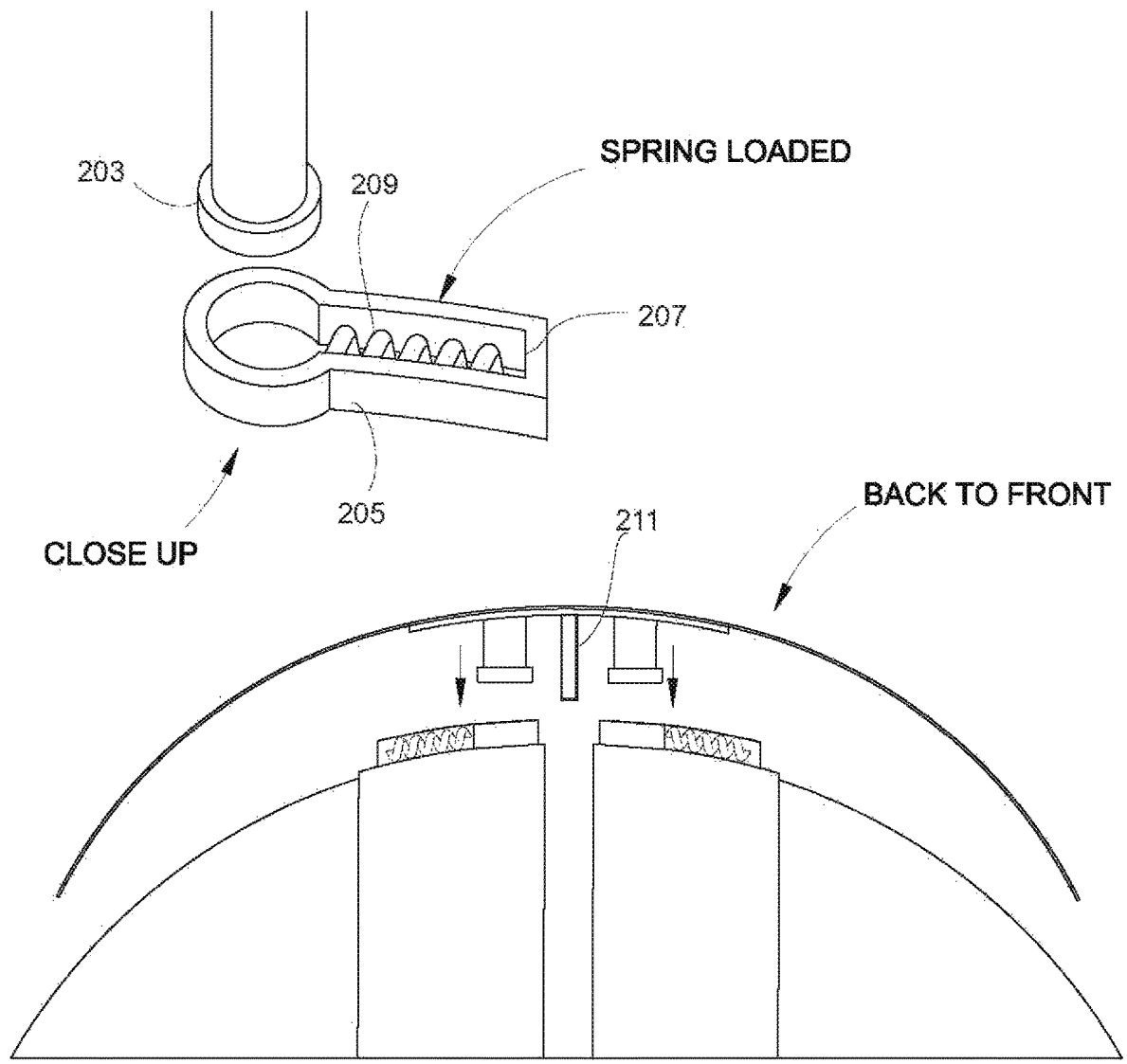
FIG. 16 illustrates the spring adjustment mechanism of the outer shell according to an embodiment of the present invention.

In some embodiments, an alternative outer shell, as illustrated in FIGS. 14-16 may be provided. Referring now to FIGS. 14-16, the alternative outer shell 201 is illustrated. The outer shell is configured to absorb the initial impact of any blunt forces applied to the helmet during use using at least two layers. Advantageously, the alternative outer shell allows a user to adjust the rigidity via a spring mechanism. The spring mechanism comprises a plurality of pins 203 and a plurality of spring loaded slots 205. In some embodiments, there are two rows of the plurality of pins, but it is understood that the number of pins as well as the rows with corresponding spring loaded slots may vary. The addition of the spring mechanism gives the outer shell a deformation variation of 1" on either side. Each spring loaded slot 205 includes a backstop 207 for each spring 209 in the slot. Various spring loaded slots, spring tensions, and/or various configurations may be possible to adjust the rigidity of the spring mechanism. As previously mentioned, the stopper mechanism is an important element of the invention. Similarly, a stopper 211 is provided on the alternative outer shell, wherein the stopper is a thin hardened rubber stopper configured to prevent each outer shell side to directly against one another. In this embodiment, the ripcord mechanism 109 previously discussed would not be needed.

OTHER CONFIGURATION AND USES

HOCKEY—Same configuration as football helmet with variations on layer thickness and with a ¾ face visor made of polycarbonate placing the facemask.

MOTORCYCLE—The motorcycle helmet will have a similar layering of materials with the exception of the thin perforated PVC insert sitting between the memory foam and the fluid filled tubes. This layer will be made of Reinforced Carbon-Carbon (RCC) measuring between 0.5 mm to 1.5 mm in thickness. This will provided greater strength and heat resistance, in the event of an accident. The motorcycle helmet will be a full face helmet with a retractable visor for the user to be able to see.

RACE CAR DRIVING—The race car driver helmet will have the same configuration of the MOTORCYCLE helmet with the exception of the VISCO-ELASTIC polymer layers. These will be replaced with polymer coated fiberglass flexible material for fire resistance.

MILITARY/LAW ENFORCEMENT—These helmets will have the same layering as the motorcycle helmet but will be a configured like the football sport helmet and will have a full face retractable visor made of Polycarbonate.

FIREMAN—These helmets will be constructed and look like the Military helmet with the exception of the inner layer of the octagon pods. The octagon pod layer will be replaced will multiple layers of polymer coated fiber glass for enhanced fire protection measuring between 0.5 mm to 6 mm in thickness.

It should be understood that various changes, substitutions, additions and alterations can be made by one skilled in the art without departing from the spirit and scope of the invention as defined by the appended claims. Moreover, the scope of the present application is not intended to be limited to the particular embodiment(s) of the device, process, machine, manufacture and composition of matter, means, methods and or steps described in the specification. As one of ordinary skill in the art will readily appreciate from the disclosure herein, processes, machines, manufacture, composition of matter, means, methods or steps, presently existing or later to be developed that perform substantially the same function or achieve substantially the same result as the corresponding embodiments described herein may be utilized according to the present invention.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An improved cranial protection apparatus comprising:
    an outer shell having at least two layers configured to absorb the initial impact of any blunt forces applied to the apparatus during use; and,
    a spring mechanism configured to allow a user to adjust the rigidity of the apparatus, wherein the spring mechanism includes a plurality of pins and a plurality of spring loaded slots, wherein each spring loaded slot of the plurality of spring loaded slots includes a circular recessed portion adapted to receive a distal end of a pin of the plurality of pins and a rectangular body having a first end and a second end, wherein the first end is open and joins the circular recessed portion and the second end is closed forming a backstop for a spring.

2. The improved cranial protection apparatus of claim 1, wherein each spring loaded slot of the plurality of spring loaded slots includes a backstop for each spring in the spring loaded slot.

3. The improved cranial protection apparatus of claim 1, further comprising a stopper configured to prevent the at least two layers of the outer shell from directly touching one another.

4. The improved cranial protection apparatus of claim 3, wherein the stopper is constructed from rubber.

5. An improved cranial protection apparatus comprising:
an outer shell configured to absorb the initial impact of any blunt forces applied to the apparatus during use, wherein the outer shell includes an outer layer and an inner layer;

a user adjustable spring mechanism having a plurality of pins and a plurality of spring loaded slots, wherein the plurality of pins are positioned on the outer layer of the outer shell and the plurality of spring loaded slots are positioned on the inner layer of the outer shell;

each pin of the plurality of pins having a proximal end and a distal end, wherein the proximal end is attached to an underside of the outer layer;

each spring loaded slot of the plurality of spring loaded slots having a first end, a rectangular body, and a second end, the first end having circular opening sized and shaped to receive the distal end of a pin of the plurality of pins, and the second end forming a backstop for a spring positioned in the rectangular body the spring loaded slot; and, the user adjustable spring mechanism configured to allow a user to adjust the rigidity of the apparatus.

\* \* \* \* \*